United States Patent [19]

Takagi

[11] Patent Number: 4,760,010
[45] Date of Patent: Jul. 26, 1988

[54] PRINTING SYSTEM COMPRISING MICROCAPSULES

[75] Inventor: Izumi Takagi, Kuwana, Japan

[73] Assignee: Brother Kogyo Kabushiki Kaisha, Aichi, Japan

[21] Appl. No.: 21,463

[22] Filed: Mar. 4, 1987

[30] Foreign Application Priority Data

Mar. 31, 1986 [JP] Japan ................................. 61-73953

[51] Int. Cl.⁴ ...................... B41M 3/12; B41J 31/14; S03C 1/72
[52] U.S. Cl. .................................. 430/138; 427/141; 427/151; 427/152; 427/153
[58] Field of Search ................. 430/138; 427/141, 151, 427/152, 153

[56] References Cited

U.S. PATENT DOCUMENTS

| | | | |
|---|---|---|---|
| 4,070,508 | 1/1978 | Ishige et al. | 427/150 |
| 4,239,815 | 12/1980 | Kato et al. | 427/150 |
| 4,444,846 | 4/1984 | Zalucha et al. | 428/424.4 |
| 4,448,516 | 5/1984 | Arney et al. | 355/100 |
| 4,501,809 | 2/1985 | Hiraishi et al. | 430/138 |
| 4,533,615 | 8/1985 | Arney et al. | 430/403 |
| 4,568,956 | 2/1986 | Matsusmita et al. | 427/151 |
| 4,578,340 | 3/1986 | Saccocio et al. | 430/151 |
| 4,592,986 | 6/1986 | Nelson et al. | 430/98 |

Primary Examiner—Mukund J. Shah
Attorney, Agent, or Firm—Kane, Dalsimer, Sullivan, Kurucz, Levy, Eisele and Richard

[57] ABSTRACT

In a printing system for printing an image on a recording sheet, adopted as the recording sheet is a sheet coated with microcapsules on one surface thereof. Each microcapsule envelopes a first component therein while the sheet itself holds a second component. The color of second component is changed when mixed with the first component. The microcapsule further envelopes a third component which increase the mechanical strength of microcapsule when light is projected thereto. An image is formed on the recording sheet by selectively rupturing the microcapsules in accordance with the image to be printed thereon, and the unruptured microcapsules remaining on the recording sheet are then hardened by exposing a light thereto and thus the image printed on the recording sheet is fixed thereon.

6 Claims, 2 Drawing Sheets

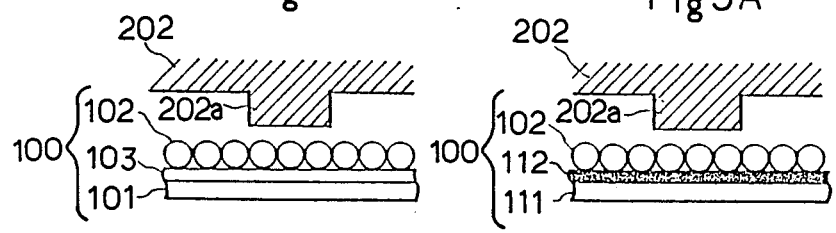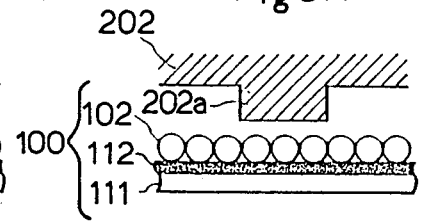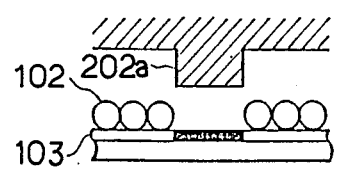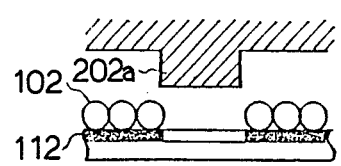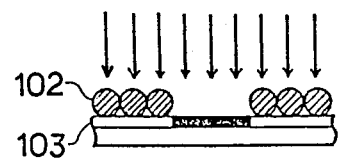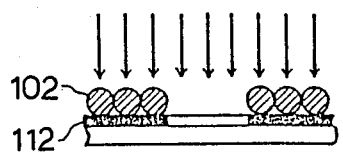

PRINTING SYSTEM COMPRISING MICROCAPSULES

BACKGROUND OF THE INVENTION

This invention relates to a printing system, and more particularly, a system for printing letters and/or figures on a recording sheet, which can be adopted for typewriters and/or printers to be connected to computer units.

Various printing systems have been proposed and actually adopted in the prior arts. One of the most popular printing systems is so-called "impact printing system" wherein types or wire dots strike an ink-ribbon against the recording sheet or directly strike the recording sheet in case the recording sheet is a pressure-sensitive one. Another one is the so-called "thermal printing system" wherein utilized are a thermal head instead of types or wire-dotts and a thermo-sensitive sheet or ribbon.

With the above prior systems wherein ink-ribbons are utilized, however, the mechanism for sequentially feeding the ribbon is required and the ribbon must be changed when it becomes the end.

With the other type prior systems wherein the pressure-sensitive sheets or thermo-sensitive sheets are utilized, when the pressure or the heat is applied onto the recording sheet after printing, the colour on the sheet would unintentionally changes, thus it is difficult to maintain the image on the recording sheet as printed.

SUMMARY OF THE INVENTION

It is therefore an object of this invention to provide an improved printing system capable of being carried out with a simple mechanism and of obtaining a preservable image on a recording sheet.

For this purpose, according to the present invention, there is provided a printing system for printing an image on a recording sheet, the improvement which comprises in that said recording sheet is coated with microcapsules on one surface thereof, each said microcapsule enveloping a first component while said recording sheet holding a second component below said microcapsules layer on said one surface thereof, the colour of said second component being changed when mixed with said first component, said microcapsule further enveloping a third component which increases the mechanical strength of microcapsule when light is projected thereto; and that said printing being carried out by means for selectively rupturing said microcapsules in accordance with an image to be printed on said recording sheet and means for exposing a light against said one surface of the recording sheet, said light projecting means being arranged downstream of said rupturing means.

BRIEF DESCRIPTION OF THE ACCOMPANYING DRAWINGS

FIGS. 2A through 2C are explanatory views showing a printing process; and

FIGS. 3A through 3C are explanatory views showing a printing process wherein another embodiment of a recording sheet is illustrated.

DESCRIPTION OF THE PREFERRED EMBODIMENTS

Figure 1:
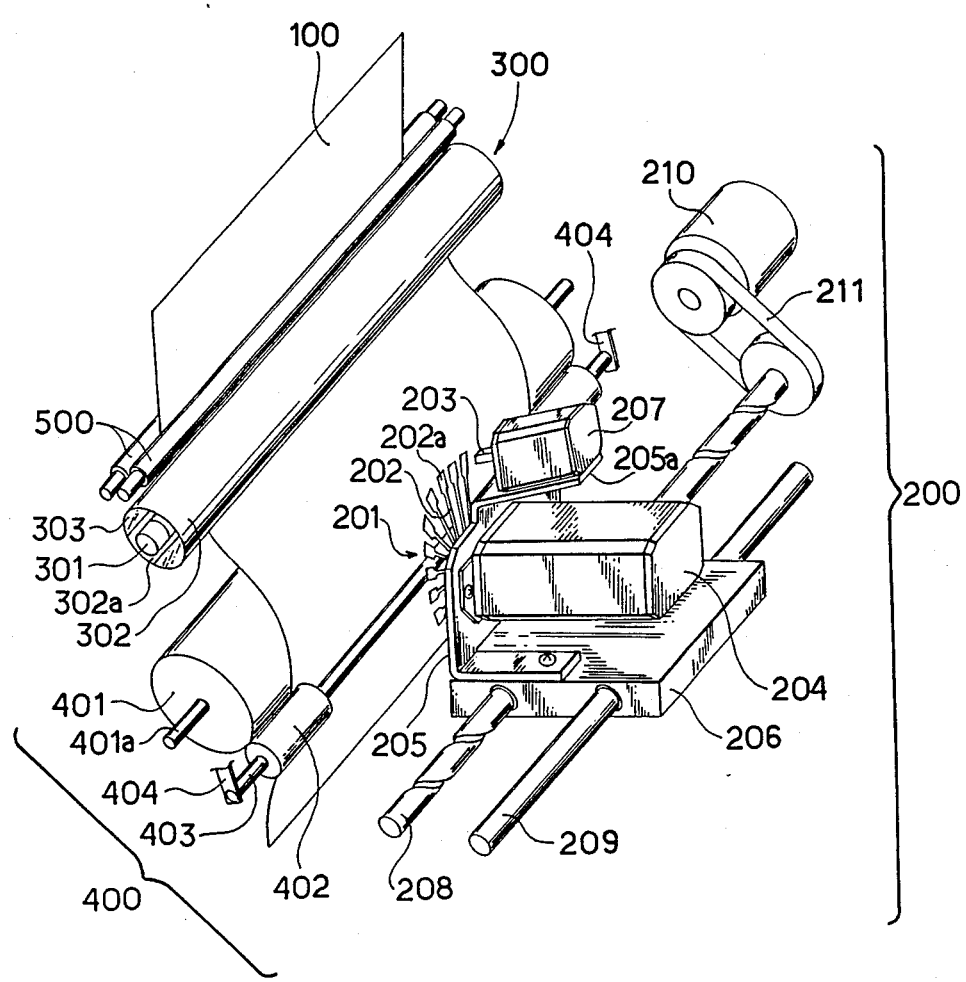
FIG. 1 is a perspective view showing a printing system embodying the invention.

A printing system illustrated in FIG. 1 comprises a recording sheet 100, a rupturing mechanism 200, a light exposing mechanism 300 and a sheet feeding mechanism 400.

The sheet feeding mechanism 400 comprises a platen 401 and a pair of side pressing rollers 402 rotatably and axially slidably mounted on a supporting shaft 403 at a suitable interval. The platen 401 is rotatably supported by a body frame (not shown) and rotated by a driving motor (not shown). At both ends of the supporting shaft 403 are pivoted are a pair of link arms 404 swingably connected to the body frame. The recording sheet 100 is inserted between the platen 401 and the pair of pressing rollers 402 and fed in an upward direction upon the rotation of the platen 401.

The rupturing mechanism 200 comprises a daisy wheel 201, the peripheral end portion of which is divided into a plurality of spokes 202 and a font of type faces 202a are provided at the top ends thereof, and a hammer 203 for striking a selected one of the type faces 202a from the rear side thereof against the circumferential surface of the platen 401. The daisy wheel 201 is supported and rotated by a driving motor 204 mounted on a fixing plate 205 which is planted on a carriage 206. The hammer 203 is connected to a solenoid 207 which is mounted on the top bent portion 205a of the fixing plate 205 so that the hammer 203 is forwardly protruded upon energization of the solenoid 207.

The carriage 206 is threaded on a spiral shaft 208 and slidably mounted on a guide shaft 209. The spiral shaft 208 and the guide shaft 209 are arranged in parallel with the axial shaft 401a of the platen 401. One end of the spiral shaft 208 is rotatably supported by the body frame and the other end is connected to a driving motor 210 through a belt 211 so as to be rotated in reversible directions and thereby shifting the carriage 206 in the horizontal direction relative to the platen 401. Both ends of the guide shaft 209 are secured to the body frame.

The light exposing mechanism 300 comprises an ultra-violet ray lamp 301 and a lamp shade 302. The lump 301 has the substantially same lateral length as that of the platen 401 and arranged in parallel therewith. Further, the lump 301 is circumferentially surrounded by the lump shade 302. The lump shade 302 has a transparent portion 302a extending in the lateral direction which faces the recording sheet 100 and the inner surface of the lump shade 302 is covered by a reflective mirror 303 except the transparent area.

The recording sheet 100 comprises, as disclosed in the U.S. Pat. No. 4,440,846 and as illustrated in FIG. 2A, a paper 101 and a plurality of microcapsules 102 coated on one surface of the paper 101. In each microcapsule 102, a dye precursor such as Toriallylmethane compound, a photocurable regin such as Torimethylpropane and a photopolymerizing initiator such as Benzophenone are enveloped, and a chromogenic material 103 such as Organic acids is held below the layer of the microcapsules 102 on the surface of the paper 101.

With the above printing system, first, the wheel driving motor 204 is driven by the signal transferred from a control unit (not shown) for rotating the daisy wheel 201 to shift the spoke 202 bearing the selected type face 202a to be positioned between the hammer 203 and the platen 401. Then, the solenoid 207 is energized so as to forwardly project the hammer 203 in accordance with the signal transferred from the control unit for striking the selected type face 202a against the circumferential surface of the platen 401.

When the recording sheet 100 is struck by the selected type face 202a of the daisy wheel 201, the microcapsules 102 in the struck area on the recording sheet 100 are ruptured, as illustrated in FIG. 2B. By this rupture of microcapsules 102, the dye precursor enveloped in ruptured microcapsules 102 stream out and react with the chromogenic material 103 on the paper 101 and colorized in accordance with the shape of the selected type face 202a.

Thereafter, the carriage driving motor 210 is driven to rotate the spiral shaft 208 to shift the carriage 206 in the lateral direction toward the next printing position on the recording sheet 100. Then, printing is again carried out. After finishing the printing for one line on the recording sheet 100, the platen 401 is rotated to shift the recording sheet 100 in the upward direction toward the next printing line thereof, then the printing continues as above described.

The recording sheet 100 on which letters and/or figures are printed by the rupturing mechanism 200 is led below the transparent portion 302a of the lamp shade 302 of the light exposing mechanism 300. There, the ultraviolet ray is exposed onto the recording sheet 100, as illustrated in FIG. 2C, so as to harden the unruptured microcapsules 102. That is, by exposing the ultraviolet ray, the photo-polymerizing initiator makes the photo-curable resin hardened in the microcapsules. Thus, the unruptured microcapsules 102 become unrupturable and the image is fixed on the sheet 100.

The recording sheet 100 once the image is fixed thereon is driven out of the system by a pair of driving rollers 500.

FIG. 3A shows another example of the sheet 100 wherein a transparent film 111 is utilized instead of the paper 101 and the upper surface of the film 111 is colored 112 in advance by the dyes etc. instead of coating the chromogenic materials 103 thereon, and further a decolorizing agent is enveloped in each microcapsule 102 instead of dye precursor. With this sheet 100, when the microcapsules 102 are ruptured by the type face 202a, as illustrated in FIG. 3B, the struck area on the film 111 is decolorized, as the decolorizing agent enveloped in the ruptured microcapsules 102 stream out and decolorize the colored surface 112 of the sheet 100, thus the negative image is formed thereon. Then, the unruptured remaining microcapsules 102 are hardened by exposing the ultraviolet ray thereon, as illustrated in FIG. 3C, so as to fix the image on the sheet 100. Thus, a negative film for multiple printing etc. can be obtained.

In the above embodiments, the daisy wheel 201 is adopted for selectively rupturing the microcapsules 102 coated on the recording sheet 100. Instead, however, a dot-impact wire may be adopted. Further, such a modification may be made that the recording sheet can be optionally drived out of the system after it passes the rupturing mechanism 200 for manually adding letters and/or figures onto the recording sheet 100, and then the recording sheet 100 is re-introduced into the system for exposing the light thereon to fix the image.

As above described, with the printing system embodying the invention, as an ink-ribbon is not utilized, it becomes unnecessary to equip the feeding mechanism therefor and to change the ribbon tape when it finishes. On the other hand, as the color on the recording sheet is not changed even if the pressure and/or the heat are applied onto the recording sheet after the image is fixed thereon, the preservable image can be obtained. Moreover, negative and positive images can be optionally obtained without any different step and/or devices.

What is claimed is:

1. A printing system for printing an image on a recording sheet, the improvement which comprises in
that said recording sheet is coated with microcapsules on one surface thereof, each said microcapsule enveloping a first component while said recording sheet holding a second component below said microcapsules layer on said one surface thereof, the color of said second component being changed when mixed with said first component, said microcapsule further enveloping a third component which increases the mechanical strength of said microcapsules when light is projected thereto; and
that said printing being carried out by means for selectively rupturing said microcapsules in accordance with an image to be printed on said recording sheet and means for exposing a light against said one surface of the recording sheet, said light projecting means being arranged downstream of said rupturing means whereby said exposing to light occurs after said rupturing of the microcapsules.

2. The printing system according to claim 1 wherein said rupturing means comprises a rotatable daisy wheel provided with a font of type faces, a hammer for striking a selected one of said type faces from the rear side thereof against said recording sheet and a carriage supporting said daisy wheel and said hammer, said carriage being laterally movable relative to said recording sheet.

3. The printing system according to claim 1 wherein said light exposing means comprises an ultraviolet ray lamp laterally extending for covering the lateral length of said recording sheet and a lamp shade surrounding said ultraviolet lamp and being provided with a laterally extending transparent area for projecting a light therefrom against said recording sheet.

4. The printing system according to claim 3 wherein the inner surface of said lamp shade is covered by a reflective mirror except said transparent area.

5. The printing system according to claim 1 wherein said first component is a dye precursor, said second component is a chromogenic material and said third component is a photo-curable regin and a photopolymerizing initiator.

6. The printing system according to claim 1 wherein said first component is a decolorizing material, said second component is dye and said third component is a photo-curable regin and a photopolymerizing initiator.

* * * * *